US011856892B2

(12) United States Patent
Corriher

(10) Patent No.: US 11,856,892 B2
(45) Date of Patent: Jan. 2, 2024

(54) SELF-ALIGNING HAY BALE UNROLLER

(71) Applicant: Theodore H. Corriher, Terrell, NC (US)

(72) Inventor: Theodore H. Corriher, Terrell, NC (US)

( * ) Notice: Subject to any disclaimer, the term of this patent is extended or adjusted under 35 U.S.C. 154(b) by 0 days.

(21) Appl. No.: 17/517,927

(22) Filed: Nov. 3, 2021

(65) Prior Publication Data

US 2022/0142052 A1    May 12, 2022

Related U.S. Application Data

(60) Provisional application No. 63/112,130, filed on Nov. 10, 2020.

(51) Int. Cl.
*A01D 87/12* (2006.01)
*B25J 15/02* (2006.01)
*B25J 9/10* (2006.01)

(52) U.S. Cl.
CPC .......... *A01D 87/127* (2013.01); *B25J 9/1065* (2013.01); *B25J 15/0266* (2013.01); *A01D 2087/128* (2013.01)

(58) Field of Classification Search
CPC ... B25J 9/1065; B25J 15/0266; A01D 87/122; A01D 87/127; A01D 2087/128; B66C 1/66; Y10S 414/124
See application file for complete search history.

(56) References Cited

U.S. PATENT DOCUMENTS

| | | | |
|---|---|---|---|
| 3,908,846 A | * | 9/1975 | Brummitt ............ A01D 87/127 294/107 |
| 3,946,887 A | | 3/1976 | Parker |
| 3,997,069 A | | 12/1976 | McCanse et al. |
| 4,008,862 A | | 2/1977 | Wilmes |
| 4,024,970 A | | 5/1977 | Schirer |
| 4,049,140 A | * | 9/1977 | Roose .................. A01D 87/127 294/107 |
| 4,090,624 A | | 5/1978 | Krein et al. |
| 4,095,706 A | | 6/1978 | Schwien et al. |
| 4,280,777 A | | 7/1981 | Gray |
| 4,336,962 A | | 6/1982 | Read |
| 4,456,293 A | * | 6/1984 | Panissidi ................ B25J 19/021 414/730 |

(Continued)

FOREIGN PATENT DOCUMENTS

| | | | | |
|---|---|---|---|---|
| CA | 1157433 A | * | 11/1983 | ........... A01D 87/127 |
| FR | 2470530 A1 | * | 6/1981 | ........... A01D 87/127 |

(Continued)

*Primary Examiner* — Gregory W Adams
(74) *Attorney, Agent, or Firm* — Muncy, Geissler, Olds & Lowe, P.C.

(57) ABSTRACT

An attachment for an industrial or farm vehicle is designed to engage, carry and unroll a round hay bale. The attachment can be adjusted to interact with hay bales of various lengths. The attachment includes a support structure with features to attach to the vehicle. A first end of a first arm is pivotably connected proximate a first end of the support structure. A first end of a second arm is pivotably connected proximate the first end of the support structure. A spacing link is pivotably connected to second ends of the first and second arms. A first hay bale spear is attached to the spacing link. A third arm has a first end pivotably connected proximate a second end of the support structure. A second hale bay spear is attached proximate to a second end of the third arm and faces toward the first hay bale spear.

20 Claims, 7 Drawing Sheets

(56) References Cited

U.S. PATENT DOCUMENTS

| | | | | |
|---|---|---|---|---|
| 4,595,333 A * | 6/1986 | Ono | ................ | B25J 19/063 |
| | | | | 294/902 |
| 4,687,402 A | 8/1987 | Zatylny | | |
| 5,033,687 A * | 7/1991 | Bates | ................ | B65H 54/553 |
| | | | | 242/129.51 |
| 5,509,770 A * | 4/1996 | Burenga | ............ | A01D 87/127 |
| | | | | D15/28 |
| 5,662,449 A * | 9/1997 | Krinhop | ............ | A01D 87/127 |
| | | | | 414/24.5 |
| 5,667,354 A * | 9/1997 | Nakazawa | ............ | B25J 9/042 |
| | | | | 414/744.5 |
| 5,938,392 A | 8/1999 | Duck | | |
| 6,099,228 A * | 8/2000 | Krogmann | ......... | A01D 90/083 |
| | | | | 414/24.6 |
| 6,247,885 B1 * | 6/2001 | Smart | ................ | A01D 90/08 |
| | | | | 414/789.7 |
| 6,394,732 B1 | 5/2002 | Sweezey | | |
| 7,537,427 B2 * | 5/2009 | Tygard | ............... | B66C 1/427 |
| | | | | 414/796.2 |
| 8,191,947 B2 * | 6/2012 | Jouan De Kervanoael | ............ | |
| | | | | B25J 13/082 |
| | | | | 901/34 |
| 9,363,947 B2 * | 6/2016 | Ramer | ............... | A01D 87/122 |
| 10,106,370 B2 * | 10/2018 | Reynolds | ............. | B65H 49/34 |
| 10,212,887 B2 | 2/2019 | Ramer et al. | | |
| 2019/0299397 A1 * | 10/2019 | Rogers | ................ | B25J 9/107 |

FOREIGN PATENT DOCUMENTS

| | | | | |
|---|---|---|---|---|
| FR | 2591062 A1 * | 6/1987 | ........... | A01D 87/127 |
| FR | 2621214 A1 * | 4/1989 | ........... | A01D 87/127 |

* cited by examiner

US 11,856,892 B2

SELF-ALIGNING HAY BALE UNROLLER

This application claims the benefit of U.S. Provisional Application No. 63/112,130, filed Nov. 10, 2020, which is herein incorporated by reference.

BACKGROUND OF THE INVENTION

1. Field of the Invention

The present invention relates to an attachment for an industrial or farm vehicle. More particularly, the present invention relates to an attachment for handling and unrolling a round hay bale.

2. Description of the Related Art

Initial designs of vehicle attachments for handling a round hay bale, e.g., unrolling a round hay bale onto the ground for consumption by livestock, were designed to engage a round hay bale of only one particular length, e.g., a four foot long round hay bale, or perhaps a five foot long round hay bale. It was required to remove the attachment from the vehicle and connect a different attachment, if a longer or shorter round hay bale was to be dispensed by the vehicle.

For instance, the attachment system of U.S. Pat. No. 4,095,706 includes arms that pivot into position at each end of the round hay bale, from a bale release position to a bale engagement position. As a result, the bale-engaging spears can only properly engage the hay bale to allow the hay bale to rotate at one position, i.e., where the right and left spears are coaxial. In this position, the right and left arms are parallel to each other. Thus, if the hay bale is longer or shorter than the width between the right and left arms in the parallel position, the engagement and continuous rotation of the hay bale is troublesome, as the right and left spears are not coaxial and will act to tear out the centers of the sides of the hay bale until the spears are no longer supporting the hay bale.

A first advancement in the art of hay bale dispensers is disclosed in U.S. Pat. No. 5,509,770, where a single attachment 10 can accommodate two or three different lengths of round hay bales to be unrolled onto the ground. FIGS. 1A and 1B illustrate the attachment 10, as disclosed in U.S. Pat. No. 5,509,770. The attachment 10 includes left and right arms 11 and 13. Left and right spears 15 and 17 are attached to second ends 19 and 21 of the left and right arms 11 and 13. First ends 23 and 25 of the left and right arms 11 and 13 are attached to left and right plates 27 and 29. The left and right plates 27 and 29 are rotatably connected to a support bar 31 at left and right pivot shafts 33 and 35, respectively. A movement generating device (not shown), such as a hydraulic cylinder, would be attached to left and right linkages 37 and 39, or directly to left and right arms 11 and 13, to cause the left and right arms 11 and 13 to pivot about the left and right pivot shafts 33 and 35. Oppose direction pivoting of the left and right arms 11 and 13 about the left and right shafts 33 and 35 will move the left and right spears 15 and 17 closer together or further apart.

FIG. 1A shows a situation wherein the left and right arms 11 and 13 are drawn closest together, as determined by left and right range limiters 41 and 43. In the position of FIG. 1A, the left and right spears 15 and 17 become coaxial and penetrate into and clamp ends of a cylindrical hay bale located between the left and right arms 11 and 13, where the hay bale has a length of about four feet. If a hay bale longer or shorter than four feet were located between the left and right arms 11 and 13, the left and right spears 15 and 17 would not be coaxial when the hay bale is clamped between the left and right spears 15 and 17, and rotation of the hay bale along the ground would quickly result in tearing out the central end sections of the round hay bale, which could result in the hay bale breaking free from the attachment 10 and potentially injuring nearby persons or livestock and/or damaging equipment, e.g., bending or breaking the left or right spears 15 and/or 17 or the left or right arms 11 or 13. At a minimum, the hay bay would then need to be rolled along the ground by pushing the hay bale, as the left and right spears 15 and 17 of the attachment 10 would not have sufficient lengths to engage the hay bale within the torn out central end sections of the round hay bale.

FIG. 1B shows that the attachment 10 of FIG. 1A may be structurally reconfigured as attachment 10A to accommodate a hay bale of approximately five feet in length. As seen in FIGS. 1A and 1B, the left plate 27 has a short edge 27a and a long edge 27b. The left pivot shaft 33 is proximate the long edge 27b, while the left arm 11 is connected to the left plate 27 proximate the short edge 27a. The right plate 29 is similarly formed. The right plate 29 has a short edge 29a and a long edge 29b. The right pivot shaft 35 is proximate the long edge 29b, while the right arm 13 is connected to the right plate 29 proximate the short edge 29a.

In FIG. 1B, the left plate 27 has been flipped over, placing the short edge 27a and the left arm 11 to the outside of the attachment 10a. Also, the right plate 29 has been flipped over, placing the short edge 29a and the right arm 13 to the outside of the attachment 10a. If the left plate 27 is flipped over, the left spear 15 is removed from a collar at the second end 19 of the left arm 11 and reinstalled into the other side of the collar at the second end 19 of the left arm 11, so as to face the second end 21 of the second arm 13. Likewise, if the right plate 29 is flipped over, the right spear 17 is removed from a collar at the second end 21 of the right arm 13 and reinstalled into the other side of the collar at the second end 21 of the right arm 13, so as to face the second end 19 of the first arm 11.

The flipping over of the left and right plates 27 and 29 and flipping of the positions of the left and right spears 15 and 17 results in spacing the left and right arms 11 and 13 about twelve inches further apart, as compared to the spacing in FIG. 1A, to accommodate a hay bale with a five foot length. If only one of the left or right plates 27 or 29 is flipped over and its corresponding left or right spear 15 or 17 is reverse mounted, the left and right arms 11 and 13 are spaced about six inches further apart, as compared to the spacing in FIG. 1A, to accommodate a hay bale with a four foot and six inch length.

SUMMARY OF THE INVENTION

The Applicant has appreciated drawbacks in the hay bale handling attachments of the prior art.

With the attachment 10/10A of FIGS. 1A and 1B, the adjustments between each configuration are time consuming, as pins and/or bolts must be removed, and the left and right arms 11 and 13 must be relocated and reattached to the support bar 31. As the left and right arms 11 and 13 are heavy, this is most likely a two man operation. Also, the left and right spears 15 and 17 must be uncoupled from the collars at the second ends 19 and 21 of the left and right arms 11 and 13, and then moved to the other sides of the collars and reattached to the collars, so as to face each other. These manual operations to reconfigure the attachment 10/10A are time consuming.

It is an object of the present invention to provide an attachment for an industrial or farm vehicle, which can be adjusted to pick up round hay bales of various lengths, such as four foot long bales and five foot long bales, with no manual reconfiguration of parts on the attachment, e.g., no parts need to be detached, rotated and/or reattached.

It is an object of the present invention to provide an attachment which can automatically bring the right and left spears proximate the second ends of the left and right arms into a coaxial alignment at any point of an entire range of distances between the left and right arms, such as between 3.5 feet to 6 feet. It is an object of the present invention to provide an attachment which can automatically begin the spears proximate the second ends of the left and right arms into coaxial alignment even while the left and right arms are non-parallel.

The Applicant has appreciated that the cylindrical length of round hay bales may vary from the standard four and five foot lengths by several inches. This variation may be due to hay bailing equipment adjustments, moisture in the hay at the time of baling, compression while being stacked or stored, etc. Therefore, it is also an object of the present invention to provide an attachment which can automatically bring the left and right spears into coaxial alignment even when the left and right arms are spaced apart at a distance to accommodate a non-standard sized round hay bale, such as a bale having a length of four foot and nine inches, or a length of five foot and three inches.

The attachment of the present invention may be used in conjunction with a variety of vehicles, such as a farm tractor, a truck, a front-loader, a skid steer or other industrial or farm vehicles.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF EMBODIMENTS OF THE INVENTION

Figure 1A:
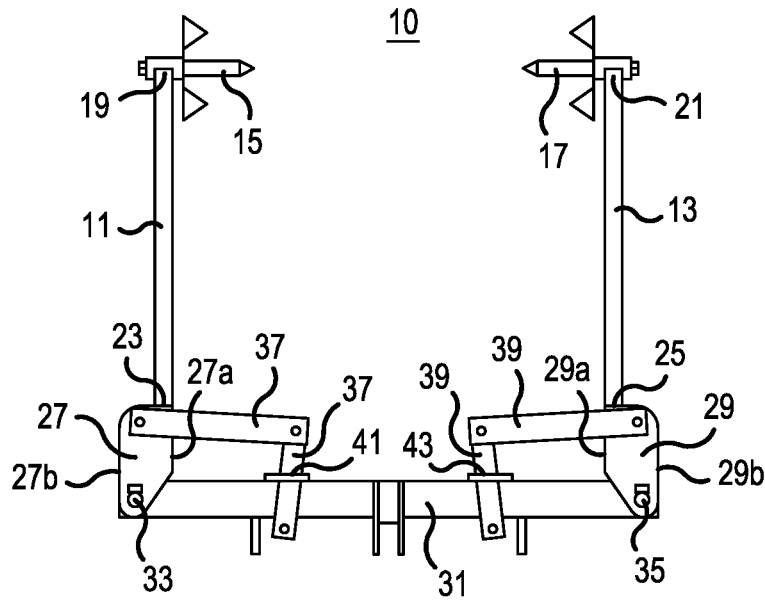
FIG. 1A is a top view of a round hay bale handling attachment in a first configuration, according to the prior art.
Figure 1B:
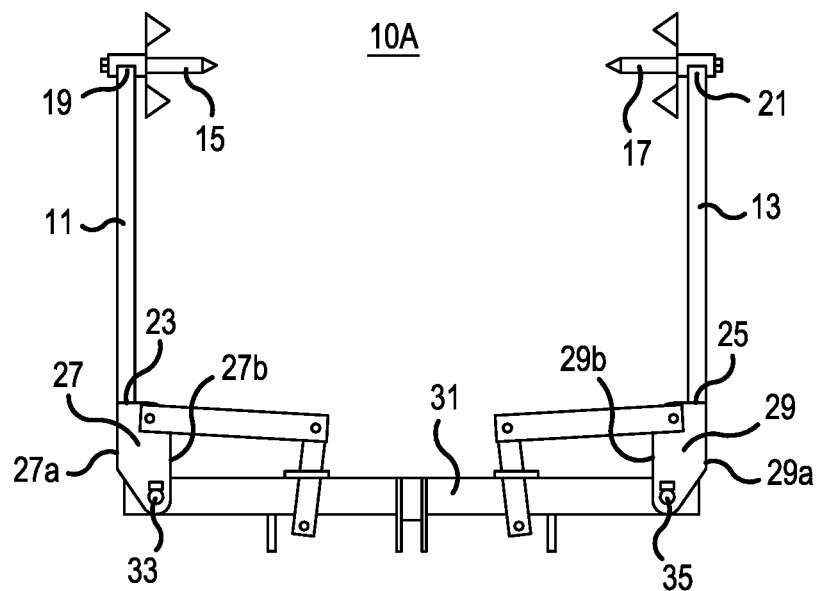
FIG. 1B is a top view of the round hay bale handling attachment of FIG. 1A in a second configuration, according to the prior art.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 2:
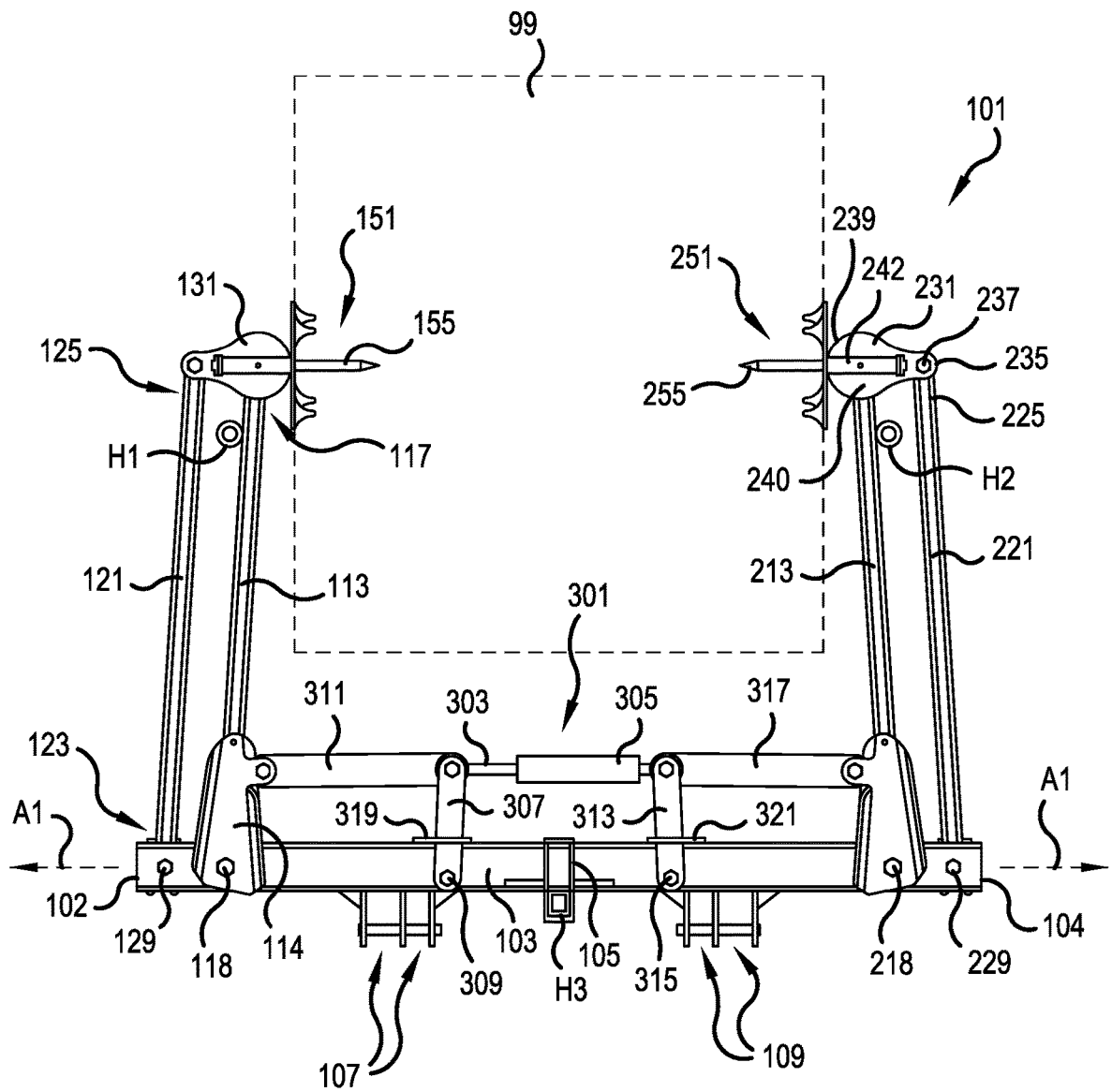
FIG. 2 is a top view of a round hay bale handling attachment, according to the present invention.
Figure 3:
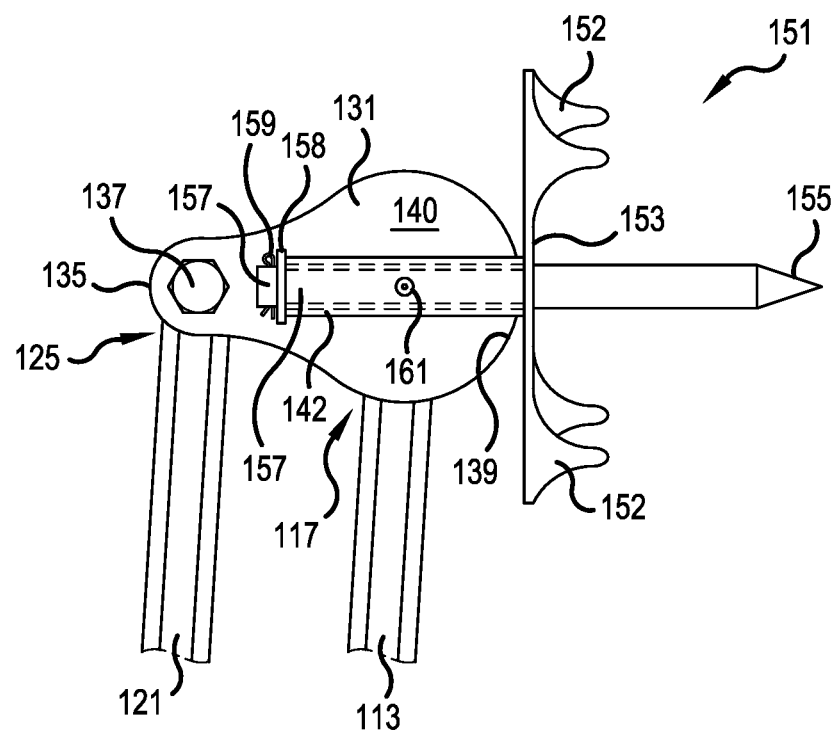
FIG. 3 is a close-up top view of a first spacing link and first hay bale spear of the attachment of FIG. 2.
Figure 4:
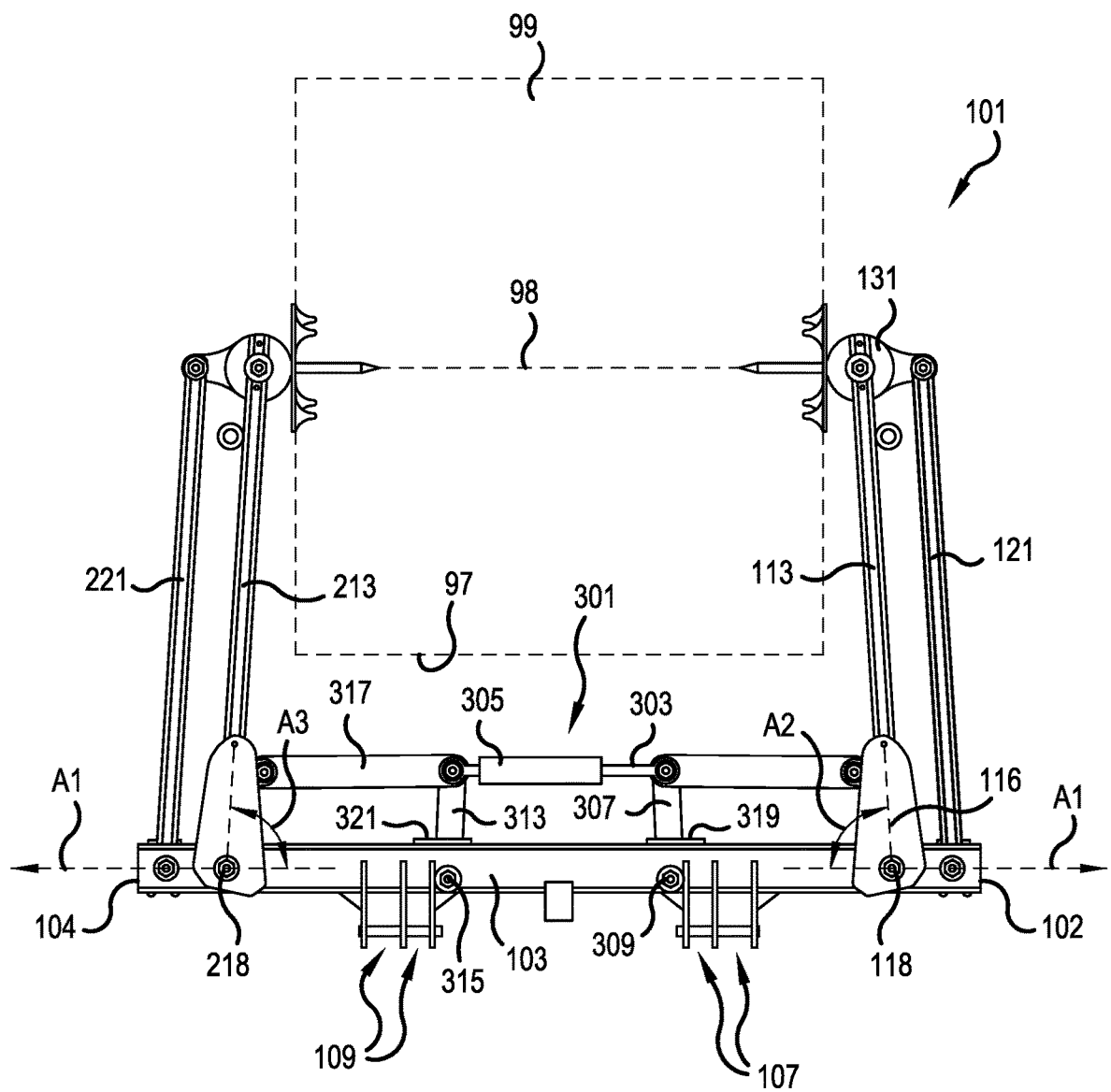
FIG. 4 is a bottom view of the round hay bale handling attachment of FIG. 2.
Figure 5:
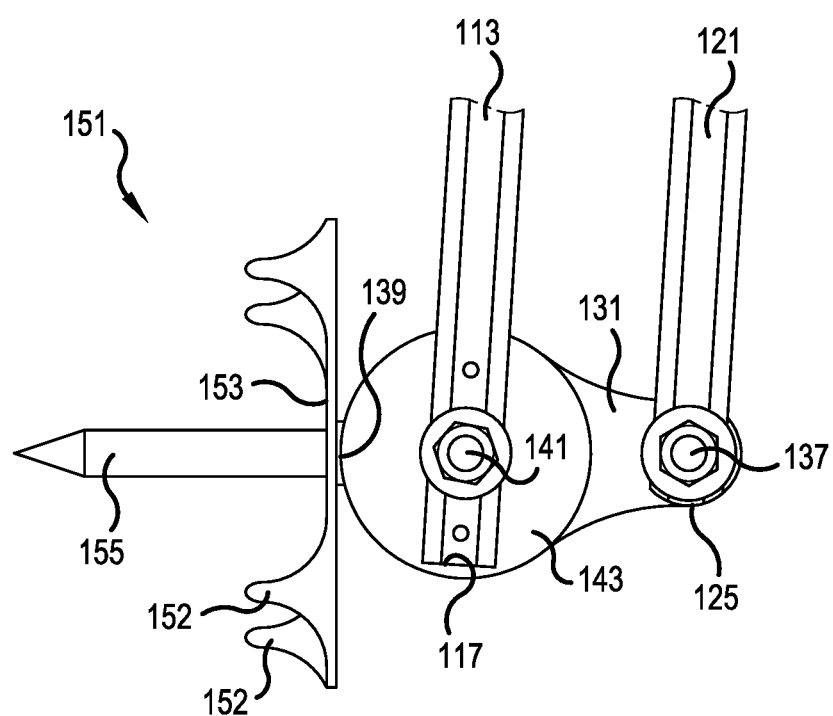
FIG. 5 is a close-up bottom view of the first spacing link and first hay bale spear of FIG. 3.
Figure 6:
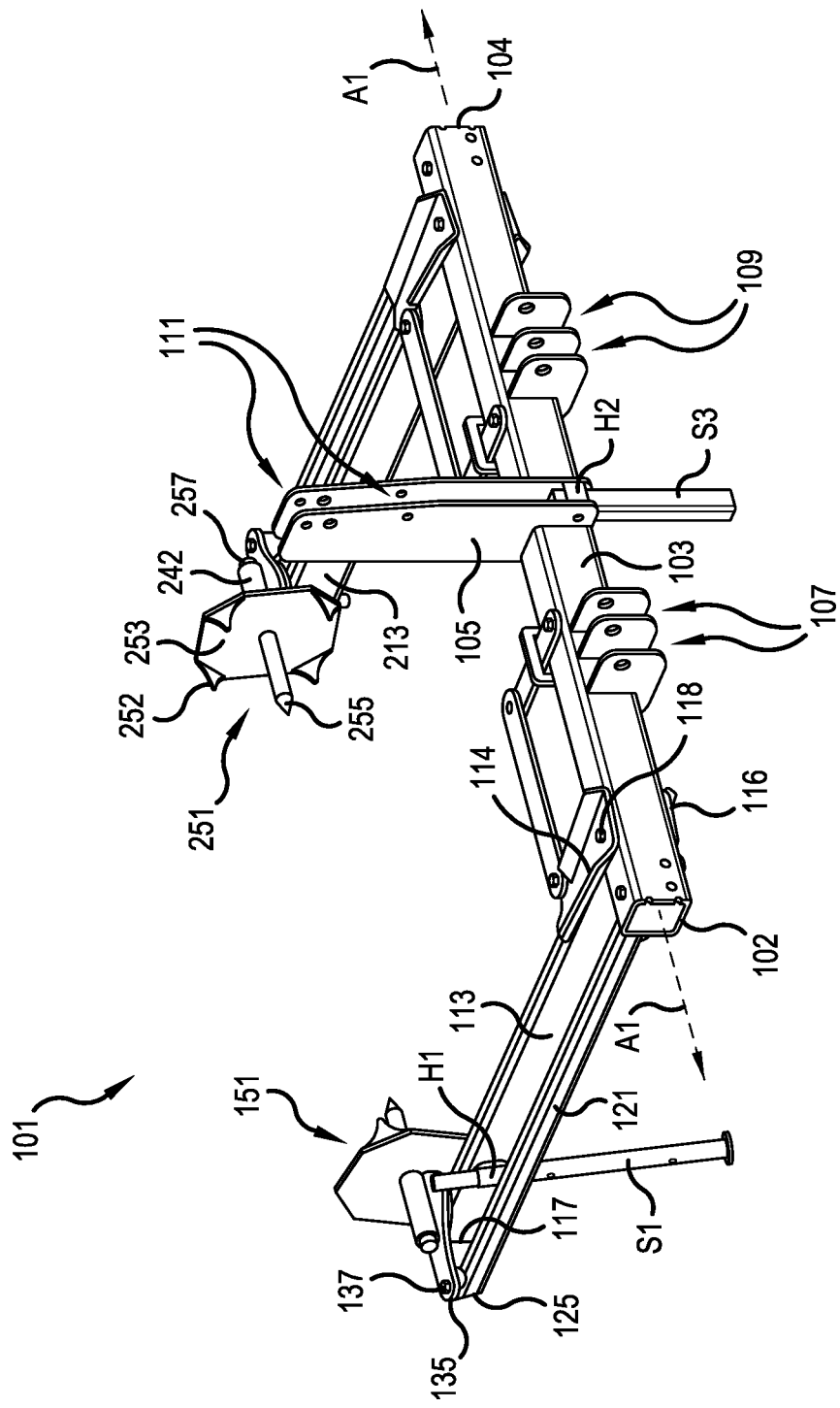
FIG. 6 is a rear perspective view of the round hay bale handling attachment of FIGS. 2 and 4.
Figure 7:
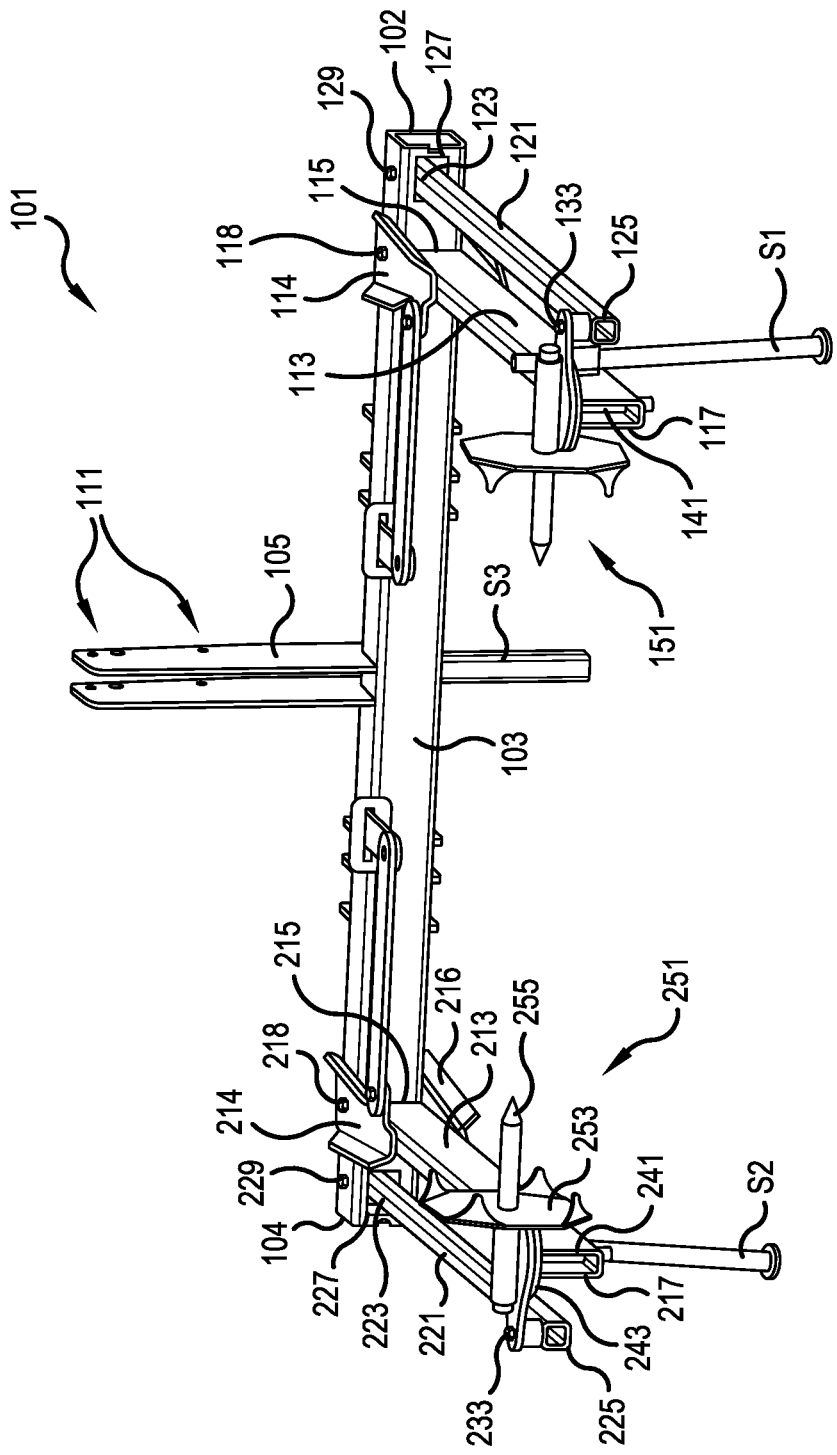
FIG. 7 is a front perspective view of the round hay bale handling attachment of FIGS. 2 and 4.

FIGS. 2-7 are all depicting a preferred embodiment of a vehicle attachment 101 for handling round hay bales 99, in accordance with the present invention. FIGS. 2 and 4 are top and bottom views, respectively, of the round hay bale handling attachment 101. FIGS. 6 and 7 are rear and front perspective views of the round hay bale handling attachment 101.

The attachment 101 for handling round hay bales 99 includes a support structure. The support structure includes a box beam 103, which extends along a first axis A1, which is approximately horizontal, between a first end 102 and a second end 104. The support structure also includes a channel member 105, which is approximately vertical (FIG. 6). The box beam 103 and channel member 105 are preferably formed of steel and rigidly attached, e.g., welded together, in a middle section of the box beam 103.

First, second and third coupling features 107, 109 and 111 are attach to the support structure, e.g., integrally formed with or welded thereto. In a preferred embodiment, the first, second and third coupling features 107, 109 and 111 are positioned in a triangular formation to attach to a three-point hitch of a farm tractor. As illustrated, there may be multiple potential locations for the first, second and third coupling features 107, 109 and 111 so that the attachment 101 may be mounted to vehicles with different coupling requirements.

A first arm 113 has a first end 115 and a second end 117 (FIG. 7). The first end 115 of the first arm 113 is pivotably connected to the box beam 103 of the support structure proximate the first end 102 of the box beam 103. The first end 115 of the first arm 113 includes an upper plate 114 welded thereto and a lower plate 116 welded thereto. The upper plate 114 is pivotably attached to a top of the box beam 103 by a first shaft 118 and the lower plate 114 is pivotably attached a bottom of the box beam 103 by the first shaft 118. In a preferred embodiment, the first shaft 118 is a first threaded bolt, which may have a head and washer engaged to the upper plate 114 and a nut and washer engaged to the lower plate 116, however other structural configurations could be used as the first shaft 118.

A second arm 121 has a first end 123 and a second end 125. The first end 123 of the second arm 121 is pivotably connected to the box beam 103 of the support structure proximate the first end 102 of the box beam 103. The first end 123 of the second arm 121 enters a cutout 127 in a sidewall of the box beam 103 (FIG. 7). The first end 123 of the second arm 121 is connected to a second shaft 129 within the box beam 103. The second shaft 129 penetrates a top and bottom of the box beam 103 and is secured to the box beam 103. In a preferred embodiment, the second shaft 129 is a second threaded bolt, which may have a head and washer engaged to the top of the box beam 103 and a nut and washer engaged to the bottom of the box beam 103, however other structural configurations could be used as the second shaft 129.

As best seen in the closeup view of FIG. 3, a first spacing link 131 is pivotably connected to the first arm 113 proximate the second end 117 of the first arm 113. The first spacing link 131 is also pivotably connected to the second arm 121 proximate the second end 125 of the second arm 121. In the illustrated embodiment, the first spacing link 131 is pear shaped. A first through hole 133 (FIG. 7) is formed proximate a first end 135 of the first spacing link 131, e.g., the smaller side of the pear shape. The second end 125 of the second arm 121 is pivotably coupled to the first through hole 133 of the spacing link 131 via a third bolt 137. A second end 139 of the first spacing link 131 includes a flat planar area 140, e.g., the larger side of the pear shape. A first threaded shaft 141 extends perpendicularly away from a bottom of the flat planar area 140 (FIG. 7). A first tube 142 is attached to a top of the flat planar area 140 of the first spacing link 131, e.g., by a welding operation. In a preferred embodiment, the first tube 142 is located along a line passing through centers of the first through hole 133 and the first threaded shaft 141.

As best seen in the closeup view of FIG. 5, the second end 117 of the first arm 113 has a first support plate 143 attached thereto, e.g., by a welding operation. The first support plate 143 has a first through hole passing therethrough such that the first threaded shaft 141 of the flat planar area 140 passes through the first through hole of the first support plate 143. By this arrangement, the first support plate 143 supports the flat planar area 140 of the first spacing link 131 for rotation about the first threaded shaft 141.

A first hay bale spear 151 includes a first panel 153 that is rigidly affixed proximate a middle section of the first hay bale spear 151, such that a pointed end 155 of the first hay bale spear 151 extends perpendicularly away from a first side of the first panel 153, and a shaft end 157 of the first hay bale spear 151 extends perpendicularly away from a second side of the first panel 153. A plurality of fins 152 may optionally be formed on the first side of the first panel 153. The plurality of fins 152 may be formed as bent edge portions of the first panel 153, as illustrated. Alternatively, the plurality of fins 152 may be attached to the first side of the first panel 153, such as by a welding operation.

The shaft end 157 of the first hay bale spear 151 is coupled within the first tube 142. The coupling may occur by an abutment of the first plate 153 with one end of the first tube 142 and an abutment between the other end of the first tube 142 and a washer 158 held in place by a removeable cotter pin 159 inserted through a hole in the shaft end 157 of the first hay bale spear 151. In a preferred embodiment, the shaft end 157 of the first hay bale spear 151 is rotatably coupled within the first tube 142. The first tube 142 may also include a grease fitting 161 so that a good rotation ability of the shaft end 157 of the first hay bale spear 151 within the first tube 142 may be maintained.

A third arm 213 has a first end 215 and a second end 217 (FIG. 7). The first end 215 of the third arm 213 is pivotably connected to the box beam 103 of the support structure proximate the second end 104 of the box beam 103. The first end 215 of the third arm 213 includes an upper plate 214 welded thereto and a lower plate 216 welded thereto. The upper plate 214 is pivotably attached to the top of the box beam 103 by a third shaft 218 and the lower plate 214 is pivotably attached the bottom of the box beam 103 by the third shaft 218. In a preferred embodiment, the third shaft 218 is a fourth threaded bolt, which may have a head and washer engaged to the upper plate 214 and a nut and washer engaged to the lower plate 216, however other structural configurations may be used as the third shaft 218.

A fourth arm 221 has a first end 223 and a second end 225. The first end 223 of the fourth arm 221 is pivotably connected to the box beam 103 of the support structure proximate the second end 104 of the box beam 103. The first end 223 of the fourth arm 221 enters a cutout 227 in a sidewall of the box beam 103 (FIG. 7). The first end 223 of the fourth arm 221 is connected to a fourth shaft 229 within the box beam 103. The fourth shaft 229 penetrates the top and bottom of the box beam 103 and is secured to the box beam 103. In a preferred embodiment, the fourth shaft 229 is a fifth threaded bolt, which may have a head and washer engaged to the top of the box beam 103 and a nut and washer engaged to the bottom of the box beam 103, however other structural configurations may be used as the fourth shaft 229.

A second spacing link 231 is pivotably connected to the third arm 213 proximate the second end 217 of the third arm 213. The second spacing link 231 is also pivotally connected to the fourth arm 221 proximate the second end 225 of the fourth arm 221. In the illustrated embodiment, the second spacing link 231 is pear shaped. A second through hole 233 (FIG. 7) is formed proximate a first end 235 of the second spacing link 231, e.g., the smaller side of the pear shape. The second end 225 of the fourth arm 221 is pivotally coupled to the second through hole 233 of the second spacing link 231 via a sixth bolt 237. A second end 239 of the second spacing link 231 includes flat planar area 240, e.g., the larger side of the pear shape. A second threaded shaft 241 extends perpendicularly away from a bottom of the flat planar area 240 (FIG. 7). A second tube 242 is attached to a top of the flat planar area 240 of the second spacing link 231, e.g., by a welding operation. In a preferred embodiment, the second tube 242 is located along a line passing through centers of the second through hole 233 and the second threaded shaft 241.

The second end 217 of the third arm 213 has a second support plate 243 attached thereto, e.g., by a welding operation. The second support plate 243 has a first through hole passing therethrough such that the second threaded shaft 241 of the flat planar area 240 passes through the second through hole of the second support plate 243. By this arrangement, the second support plate 243 supports the flat planar area 240 of the second spacing link 231 for rotation about the second threaded shaft 241.

A second hay bale spear 251 includes a second panel 253 that is rigidly affixed proximate a middle section of the second hay bale spear 251, such that a pointed end 255 of the second hay bale spear 251 extends perpendicularly away from a first side of the second panel 253, and a shaft end 257 of the second hay bale spear 251 extends perpendicularly away from a second side of the second panel 253. A plurality of fins 252 may optionally be formed on the first side of the second panel 253. The plurality of fins 252 may be formed as bent edge portions of the second panel 253, as illustrated. Alternatively, the plurality of fins 252 may be attached to the first side of the second panel 253, such as by a welding operation.

The shaft end 257 of the second hay bale spear 251 is coupled within the second tube 242. The coupling may occur by an abutment of the second plate 253 with one end of the second tube 242 and an abutment between the other end of the second tube 242 and a washer held in place by a removeable cotter pin inserted through a hole in the shaft end 257 of the second hay bale spear 251. In a preferred embodiment, the shaft end 257 of the second hay bale spear 251 is rotatably coupled within the second tube 242. The second tube 242 may also include a grease fitting so that a good rotation ability of the shaft end 257 of the second hay bale spear 251 within the second tube 242 may be maintained.

A movement imparting device 301 may be attached between the first arm 113 and the third arm 213. In a preferred embodiment, the movement imparting device 301 includes a rod 303 which extends and retracts from a cylinder 305. The movement of the rod 303 may be caused by hydraulic force, but alternatively may be caused by a threaded rod being engaged by an electrically driven worm gear within the cylinder 305, or by other known movement imparting systems, such as a pneumatic system. Preferably, the rod 303 is attached the first arm 113 by a first rotating link 307 which can rotate in an arc fashion about a first bolted axis 309. The first rotating link 307 is connected to a first reciprocating link 311, which is in turn connected to the first arm 113.

Similarly, the cylinder 305 is attached to the third arm 213 by a second rotating link 313 which can rotate in an arc fashion about a second bolted axis 315. The second rotating link 313 is connected to a second reciprocating link 317, which is in turn connected to the third arm 213. In a preferred embodiment and as best seen in FIG. 4, rotation of the first rotating link 307 is limited by a first range limiter 319 which limits a pivot angle A2 between the first arm 113 and the first axis A1 of the box beam 103 between a minimum angle and a maximum angle. Likewise, rotation of the second rotating link 313 is limited by a second range limiter 321 which limits a pivot angle A3 between the third arm 213 and the first axis A1 of the box beam 103 between a minimum angle and a maximum angle.

FIGS. 1, 4 and 6-7 illustrate the minimum angles of the pivot angles A2 and A3. The minimum angles might be in the range of 70 to 88 degrees, such as in the range of 75 of 85 degrees, or about 80 degrees. The maximum angles of the pivot angles A2 and A3 might be in the range of 92 to 110 degrees, such as in the range of 95 degrees to 105 degrees, or about 100 degrees. When the angles A2 and A3 of the first and third arms 113 and 213 are at their respective minimums, the shaft ends 157 and 257 of the first and second hay bale spears 151 and 251 are coaxially oriented or aligned relative to each other. Also, when the angles A2 and A3 of the first and third arms 113 and 213 are at their respective maximums, the shaft ends 157 and 257 of the first and second hay bale spears 151 and 251 are coaxially oriented or aligned relative to each other.

As the movement imparting device 301 causes the first arm 113 to change its angle A2 relative to the first axis A1 of the boxed beam 103, the second arm 121 simultaneously rotates about the second shaft 129 relative to the box beam 103. The first and second arms 113 and 121 pivot simultaneously because of their connection to the first spacing link 131. The first arm 113 and the second arm 121 remain parallel to each other throughout their range of movement. The first spacing link 131 moves as the first and second arms 113 and 121 pivot relative to the boxed beam 103 such that an extension direction along the pointed end 155 and shaft end 157 of the first hay bale spear 151 continuously points in a direction parallel to the first axis A1, regardless of the pivot angle A2 between the first arm 113 and the first axis A1 of the boxed beam 103. The same is true regarding the pivoting angle A3 of the third arm 213 in that an extension direction along the pointed end 255 and shaft end 257 of the second hay bale spear 251 continuously points in a direction parallel to the first axis A1. Whenever, the pivot angle A2 of the first arm 113 is equal to the pivot angle A3 of the third arm 213, the extension directions along the pointed ends 155/255 and shaft ends 157/257 of the first and second hay bale spears 151/251 become coaxially oriented relative to each other.

A method of unrolling a round hay bale 99 includes opening the first and third arms 113 and 213 using the movement imparting device 301 to spread the first and second hay bale spears 151 and 251 apart. The attachment 101 is elevated so that a central axis 98 of the round hay bale 99 is coplanar and parallel to a direction in which and first and second hay bale spears point. The elevation occurs by the vehicle applying a lift to the first, second and third coupling features 107, 109 and 111. The vehicle is driven to orient a back edge 97 of an outer cylindrical surface of the round hale bale 99 approximately parallel to the boxed beam 103. It is also important to have the round hay bale 99 centered between the first and second ends 102 and 104 of the boxed beam 103, or more precisely centered between the first and second hay bale spears 151 and 251 while they are located at their maximum angles A2 and A3.

The vehicle operator then moves an actuator to operate the movement imparting device 301 to pivot the first and third arms 113 and 213 toward the round hay bale 99 until the first and second spears 151 and 251 engage into the round hay bale 99 proximate the central axis 98 of the round hay bale 99. The optional plurality of fins 152 and 252 of the first and second panels 153 and 253 may also engage into the round hay bale 99 when the first and second hay bale spears 151 and 251 are pressed into the round hay bale 99. The engagements into the round hay bale 99 are strong enough to allow the vehicle to lift the round hay bale 99 and move it to a desired location, e.g., a field with livestock.

Finally, the vehicle will unroll the round hay bale 99 by lowering it and engaging the outer cylindrical surface of the round hay bale 99 with the ground with enough force to create a drag, so that the round hay bale 99 unrolls as the attachment 101 is moved along the ground by the vehicle. As hay is paid off of the round hay bale 99, the attachment 101 may be further lowered to again introduce a drag to the outer cylindrical surface of the round hay bale 99 as the vehicle is driven to pay off hay. It is preferred that the shaft ends 157 and 257 of the first and second hay bale spears 151 and 251 rotate within the first and second tubes 142 and 242 to facilitate the unrolling of the round hay bale 99. However, the structures of the invention are still advantageous if the shaft ends 157 and 257 of the first and second hay bale spears 151 and 251 are fixed within the first and second tubes 142 and 242 and do not rotate. In such a circumstance, the round hay bale may then rotate about (as opposed to rotating with) the pointed ends 155 and 255 of the first and second hay bale spears 151 and 251.

First, second and third adjustable height stands S1, S2 and S3 may be coupled into first, second and third holders H1, H2 and H3 formed on, or attached to, parts of the attachment 101. For example, first and second holders H1 and H2 may be attached to sidewalls of the first and third arms 113 and 213 and may removably and adjustably receive the first and second stands S1 and S2, respectively. The third holder H3 may be integrally formed within the vertically oriented, channel member 105 of the support structure. The third holder H3 may removably and adjustably receive the third stand S3. The first, second and third stands S1, S2 and S3 hold the attachment 101 when disconnected from the vehicle, and position the disconnected attachment 101 in an elevated position so that a vehicle can pull up to the attachment 101 for reconnection.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. A farm tractor three-point hitch attachment for handling round hay bales, comprising:
   a support structure including first, second and third coupling features positioned in a triangular formation to attach to a three-point hitch of a farm tractor;
   a first arm having a first end and a second end, wherein said first end of said first arm is pivotably connected to said support structure proximate a first end of said support structure;
   a second arm having a first end and a second end, wherein said first end of said second arm is pivotably connected to said support structure proximate said first end of said support structure, and wherein the pivotable connection between said first end of said second arm and said support structure is spaced from the pivotable connection between said first end of said first arm and said support structure;
   a spacing link pivotably connected to said first arm proximate said second end of said first arm, said spacing link also being pivotably connected to said second arm proximate said second end of said second arm, wherein the pivotable connection between said second end of said second arm and said spacing link is spaced from the pivotable connection between said second end of said first arm and said spacing link;
   a hay bale spear attached to said spacing link;
   a panel rigidly affixed proximate a middle section of said hay bale spear, such that a pointed end of said hay bale spear extends perpendicularly away from a first side of said panel, and a shaft end of said hay bale spear extends perpendicularly away from a second side of said panel; and
   a tube attached to said spacing link, and wherein said shaft end of said hay bale spear is coupled within said tube.

2. The farm tractor three-point hitch attachment according to claim 1, wherein said shaft end of said hay bale spear is rotatably coupled within said tube.

3. The farm tractor three-point hitch attachment according to claim 1, further comprising:
   a plurality of fins formed as bent edge portions of said panel or attached to said panel, wherein said plurality of fins engage a hay bale when said hay bale spear is pressed into a hay bale.

4. The farm tractor three-point hitch attachment according to claim 1, further comprising:
   a movement imparting device attached to one of said first arm or said second arm, said movement imparting device causing said first arm and said second arm to simultaneously rotate relative to said support structure.

5. The farm tractor three-point hitch attachment according to claim 4, wherein said movement imparting device includes a rod which extends and retracts from a cylinder.

6. The farm tractor three-point hitch attachment according to claim 1, wherein said support structure includes a box beam, which extends along a first axis, and wherein said spacing link moves as said first and second arms pivot relative to said support structure such that said hay bale spear continuously points in a direction parallel to said first axis, regardless of a pivot angle between said first arm and said first axis.

7. The farm tractor three-point hitch attachment according to claim 1, wherein said hay bale spear is a first hay bale spear, and further comprising:

a third arm having a first end and a second end, wherein said first end of said third arm is pivotably connected to said support structure proximate a second end of said support structure; and a second hale bay spear attached proximate to said second end of said third arm to face toward said first hay bale spear.

8. A farm tractor three-point hitch attachment for handling round hay bales, comprising:
- a support structure including first, second and third coupling features positioned in a triangular formation to attach to a three-point hitch of a farm tractor;
- a first arm having a first end and a second end, wherein said first end of said first arm is pivotably connected to said support structure proximate a first end of said support structure;
- a second arm having a first end and a second end, wherein said first end of said second arm is pivotably connected to said support structure proximate said first end of said support structure, and wherein the pivotable connection between said first end of said second arm and said support structure is spaced from the pivotable connection between said first end of said first arm and said support structure;
- a spacing link pivotably connected to said first arm proximate said second end of said first arm, said spacing link also being pivotably connected to said second arm proximate said second end of said second arm, wherein the pivotable connection between said second end of said second arm and said spacing link is spaced from the pivotable connection between said second end of said first arm and said spacing link; and
- a hay bale spear attached to said spacing link, wherein said support structure includes a box beam, and said first end of said first arm includes an upper plate welded thereto and a lower plate welded thereto, said upper plate being pivotably attached to a top of said box beam by a first shaft and said lower plate being pivotably attached a bottom of said box beam by said first shaft.

9. The farm tractor three-point hitch attachment according to claim 8, wherein said first end of said second arm enters a cutout in a sidewall of said box beam and is connected to a second shaft within said box beam, said second shaft penetrating a top and bottom of said box beam and being secured to said box beam.

10. The farm tractor three-point hitch attachment according to claim 9, wherein said first shaft is a first threaded bolt and said second shaft is a second thread bolt.

11. The farm tractor three-point hitch attachment according to claim 8, further comprising:
- a movement imparting device attached to one of said first arm or said second arm, said movement imparting device causing said first arm and said second arm to simultaneously rotate relative to said support structure.

12. The farm tractor three-point hitch attachment according to claim 11, wherein said movement imparting device includes a rod which extends and retracts from a cylinder.

13. A farm tractor three-point hitch attachment for handling round hay bales, comprising:
- a support structure including first, second and third coupling features positioned in a triangular formation to attach to a three-point hitch of a farm tractor;
- a first arm having a first end and a second end, wherein said first end of said first arm is pivotably connected to said support structure proximate a first end of said support structure;
- a second arm having a first end and a second end, wherein said first end of said second 	arm is pivotably connected to said support structure proximate said first end of said support structure, and wherein the pivotable connection between said first end of said second arm and said support structure is spaced from the pivotable connection between said first end of said first arm and said support structure;
- a spacing link pivotably connected to said first arm proximate said second end of said first arm, said spacing link also being pivotably connected to said second arm proximate said second end of said second arm, wherein the pivotable connection between said second end of said second arm and said spacing link is spaced from the pivotable connection between said second end of said first arm and said spacing link; and
- a hay bale spear attached to said spacing link, wherein said spacing link includes a first through hole formed proximate a first end thereof, and said second end of said second arm is pivotably coupled to said first through hole of said spacing link via a third threaded bolt, wherein a second end of said spacing link includes a flat planar area and a first threaded shaft extending perpendicularly away from said flat planar area, wherein said second end of said first arm has a first support plate attached thereto, and wherein said first support plate has a first through hole passing therethrough such that said first threaded shaft of said flat planar area passes through said first though hole of said first support plate, whereby said first support plate supports said flat planar area of said spacing link for rotation about said first threaded shaft.

14. The farm tractor three-point hitch attachment according to claim 13, further comprising:
- a movement imparting device attached to one of said first arm or said second arm, said movement imparting device causing said first arm and said second arm to simultaneously rotate relative to said support structure, wherein said movement imparting device includes a rod which extends and retracts from a cylinder.

15. A farm tractor three-point hitch attachment for handling round hay bales, comprising:
- a support structure including first, second and third coupling features positioned in a triangular formation to attach to a three-point hitch of a farm tractor;
- a first arm having a first end and a second end, wherein said first end of said first arm is pivotably connected to said support structure proximate a first end of said support structure;
- a second arm having a first end and a second end, wherein said first end of said second arm is pivotably connected to said support structure proximate said first end of said support structure, and wherein the pivotable connection between said first end of said second arm and said support structure is spaced from the pivotable connection between said first end of said first arm and said support structure;
- a first spacing link pivotably connected to said first arm proximate said second end of said first arm, said first spacing link also being pivotably connected to said second arm proximate said second end of said second arm, wherein the pivotable connection between said second end of said second arm and said first spacing link is spaced from the pivotable connection between said second end of said first arm and said first spacing link;
- a first hay bale spear attached to said first spacing link;

a third arm having a first end and a second end, wherein said first end of said third arm is pivotably connected to said support structure proximate a second end of said support structure;

a fourth arm having a first end and a second end, wherein said first end of said fourth arm is pivotably connected to said support structure proximate said second end of said support structure, and wherein the pivotable connection between said first end of said fourth arm and said support structure is spaced from the pivotable connection between said first end of said third arm and said support structure;

a second spacing link pivotably connected to said third arm proximate said second end of said third arm, said second spacing link also being pivotably connected to said fourth arm proximate said second end of said fourth arm, wherein the pivotable connection between said second end of said fourth arm and said second spacing link is spaced from the pivotable connection between said second end of said third arm and said second spacing link;

a second hay bale spear attached to said second spacing link;

a first range limiter which limits a pivot angle between said first arm and said support structure between a minimum angle and a maximum angle; and a second limiter which limits a pivot angle between said third arm and said support structure between a minimum angle and a maximum angle, wherein when said first and third arms are at their respective minimum angles said first and second hay bale spears are coaxially oriented relative to each other, and wherein when said first and third arms are at their respective maximum angles said first and second hay bale spears are coaxially oriented relative to each other.

16. The farm tractor three-point hitch attachment according to claim 15, wherein said first and second arms remain parallel as said first and second arms, connected by said first spacing link, pivot simultaneously relative to said support structure; and wherein said third and fourth arms remain parallel as said third and fourth arms, connected by said second spacing link, pivot simultaneously relative to said support structure.

17. The farm tractor three-point hitch attachment according to claim 15, wherein said support structure includes a box beam, which extends along a first axis, and wherein said first spacing link moves as said first and second arms pivot relative to said support structure such that said first hay bale spear points in a direction parallel to said first axis, regardless of a pivot angle between said first arm and said first axis; and wherein said second spacing link moves as said third and fourth arms pivot relative to said support structure such that said second hay bale spear points in a direction parallel to said first axis, regardless of a pivot angle between said third arm and said first axis.

18. The farm tractor three-point hitch attachment according to claim 15, wherein when the pivot angle between said first arm and said support structure is equal to the pivot angle between said third arm and said support structure, said first and second hay bale spears are coaxially oriented relative to each other.

19. The farm tractor three-point hitch attachment according to claim 15, further comprising:

a movement imparting device attached to one of said first arm or said second arm, said movement imparting device causing said first arm and said second arm to simultaneously rotate relative to said support structure.

20. The farm tractor three-point hitch attachment according to claim 19, wherein said movement imparting device includes a rod which extends and retracts from a cylinder.

* * * * *